(12) United States Patent
Natanzon et al.

(10) Patent No.: US 10,469,518 B1
(45) Date of Patent: Nov. 5, 2019

(54) METHOD AND SYSTEM FOR IMPLEMENTING CYBER SECURITY AS A SERVICE

(71) Applicant: EMC IP Holding Company LLC, Hopkinton, MA (US)

(72) Inventors: Assaf Natanzon, Tel Aviv (IL); Amit Lieberman, Kefar Sava (IL); Oron Golan, Meitar (IL); Yuri Manusov, Beer Sheba (IL); Raul Shnier, Kibbutz Ruhama (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 194 days.

(21) Appl. No.: 15/660,236

(22) Filed: Jul. 26, 2017

(51) Int. Cl.
*H04L 29/06* (2006.01)
(52) U.S. Cl.
CPC ...... *H04L 63/1433* (2013.01); *H04L 63/1416* (2013.01)
(58) Field of Classification Search
CPC combination set(s) only.
See application file for complete search history.

(56) References Cited

U.S. PATENT DOCUMENTS

| | | | | |
|---|---|---|---|---|
| 8,978,141 | B2 * | 3/2015 | Eliseev | G06F 21/566 726/24 |
| 9,235,632 | B1 | 1/2016 | Natanzon | |
| 9,389,800 | B1 | 7/2016 | Natanzon | |
| 2005/0187740 | A1 * | 8/2005 | Marinescu | G06F 21/566 703/1 |
| 2008/0209556 | A1 * | 8/2008 | Fu | G06F 9/44589 726/22 |
| 2009/0007270 | A1 | 1/2009 | Futoransky | |
| 2009/0307763 | A1 | 12/2009 | Rawlins | |
| 2010/0169948 | A1 * | 7/2010 | Budko | G06F 21/53 726/1 |
| 2010/0175108 | A1 * | 7/2010 | Protas | G06F 21/53 726/3 |
| 2011/0185231 | A1 * | 7/2011 | Balestrieri | G06F 11/3672 714/27 |
| 2012/0260344 | A1 * | 10/2012 | Maor | G06F 11/3688 726/25 |
| 2012/0324183 | A1 * | 12/2012 | Chiruvolu | G06F 11/2038 711/162 |
| 2014/0280873 | A1 * | 9/2014 | Stickle | H04L 63/1433 709/224 |
| 2015/0007325 | A1 * | 1/2015 | Eliseev | G06F 21/566 726/24 |
| 2015/0047045 | A1 * | 2/2015 | Salsamendi | G06F 21/50 726/25 |
| 2015/0309831 | A1 | 10/2015 | Powers | |
| 2015/0319186 | A1 * | 11/2015 | Lietz | H04L 67/10 726/25 |

(Continued)

*Primary Examiner* — Malcolm Cribbs
(74) *Attorney, Agent, or Firm* — Chamberlain, Hrdlicka, White, Williams, & Aughtry (57) ABSTRACT

A method and system for implementing cyber security as a service in a cloud computing environment. Specifically, method and system entail leveraging existing disaster recovery (DR) solutions to perform cyber security tests and assess cyber security vulnerabilities, if any, on system and/or application images backed up on the existing DR solution. In leveraging existing DR solutions, a cyber security service is integrated into the existing DR solution as an additional feature.

15 Claims, 6 Drawing Sheets

(56) References Cited

U.S. PATENT DOCUMENTS

| | | | |
|---|---|---|---|
| 2016/0314302 A1* | 10/2016 | Sabetta | G06F 21/577 |
| 2016/0366185 A1* | 12/2016 | Lee | H04L 63/20 |
| 2017/0068815 A1* | 3/2017 | Lu | G06F 21/566 |
| 2017/0098071 A1* | 4/2017 | Stopel | G06F 21/554 |
| 2017/0126709 A1 | 5/2017 | Baradaran | |
| 2017/0302689 A1 | 10/2017 | Jiang | |
| 2018/0063181 A1 | 3/2018 | Jones | |
| 2018/0212987 A1 | 7/2018 | Tamir | |

* cited by examiner

METHOD AND SYSTEM FOR IMPLEMENTING CYBER SECURITY AS A SERVICE

BACKGROUND

The execution of cyber security tests on an actual computing system by intentionally subjecting the actual computing system to cyber security attacks presents a major risk to, despite the benefits of attempting to protect, the actual computing system through the performance of such tests.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for implementing cyber security as a service in a cloud computing environment. Specifically, one or more embodiments of the invention entail leveraging existing disaster recovery (DR) solutions to perform cyber security tests and assess cyber security vulnerabilities, if any, on system images backed up on the existing DR solution. In leveraging existing DR solutions, a cyber security service is integrated into the existing DR solution as an additional feature.

Figure 1:
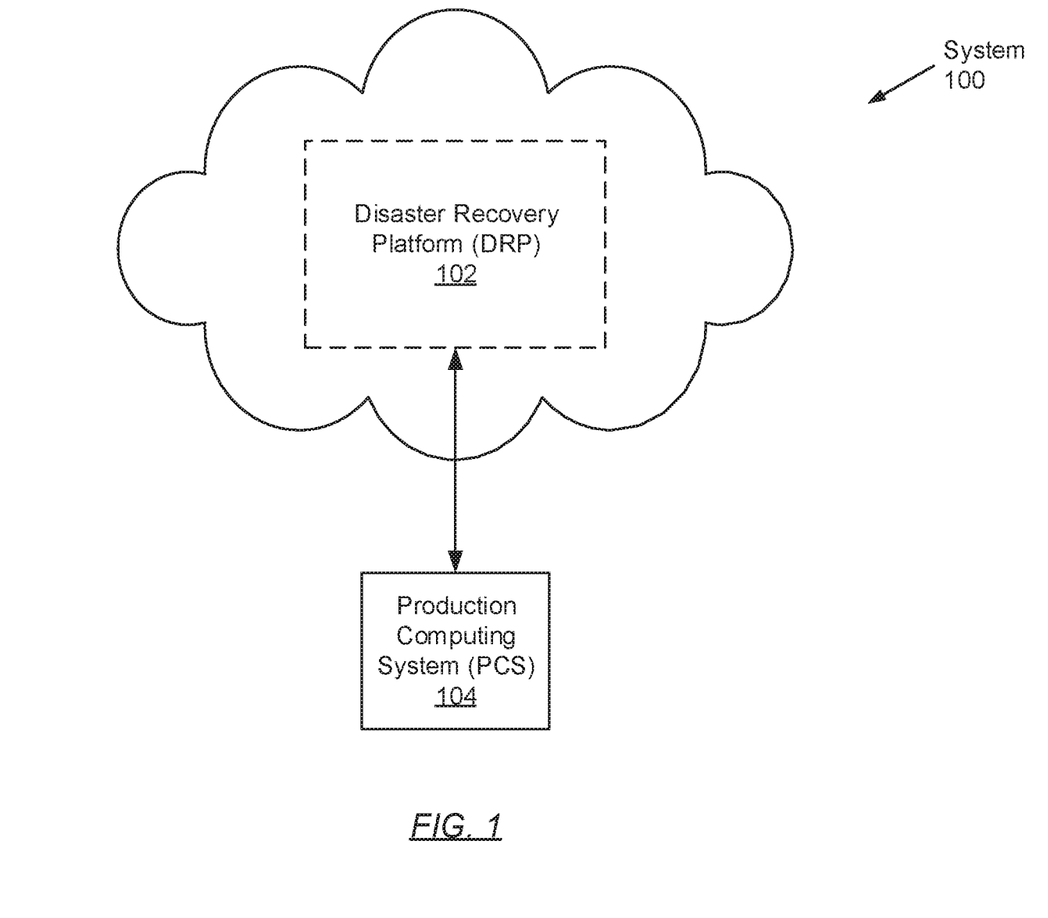
FIG. 1 shows a system in accordance with one or more embodiments of the invention.

FIG. 1 shows a system in accordance with one or more embodiments of the invention. The system (100) includes a disaster recovery platform (DRP) (102) operatively connected to a production computing system (PCS) (104). Each of these components is described below.

In one embodiment of the invention, the DRP (102) and the PCS (104) may be directly or indirectly connected to one another through a network (e.g., a local area network (LAN), a wide area network (WAN) such as the Internet, a mobile network, or any other type of network). The network (not shown) may be implemented using any combination of wired and/or wireless connections. In embodiments in which the DRP (102) and the PCS (104) are indirectly connected, there may be other networking components or systems (e.g., switches, routers, gateways, etc.) that facilitate communication and/or information exchange. Further, the DRP (102) and the PCS (104) may communicate with one another using any combination of wired and/or wireless communication protocols.

In one embodiment of the invention, the DRP (102) may be a hardware and/or software implemented service that provides failover and cyber security to a cloud computing environment. The DRP (102) may be implemented on one or more servers (not shown). Each server may be a physical server or a virtual server that may be cloud-based. In one embodiment of the invention, the DRP (102) may be implemented on one or more computing systems similar to the exemplary computing system shown in FIG. 5. Further, the DRP (102) may be any set of computer systems that may be programmed to receive requests, process requests, and based on the processing of requests, extend services and/or resources to the PCS (104). The DRP (102) is described in further detail below with respect to FIG. 2.

In one embodiment of the invention, the PCS (104) may be any computing system (see e.g., FIG. 5) used for various applications. These applications may, for example, require large-scale and complex data processing. In one embodiment of the invention, the PCS (104) may be any computing system that may serve multiple users concurrently. Further, the PCS (104) may be programmed to provide and manage the allocation of computing resources towards the implementation of various processes (e.g., tasks) that may be instantiated by one or more users. Examples of the PCS (104) include, but are not limited to, a cluster of interconnected desktop computers, laptop computers, smailphones, tablet computers, gaming consoles, servers, mainframes, or any combination thereof.

While FIG. 1 shows a configuration of components, other system configurations may be used without departing from the scope of the invention. For example, in one embodiment of the invention, the DRP (102) may support multiple PCSs (104).

Figure 2:
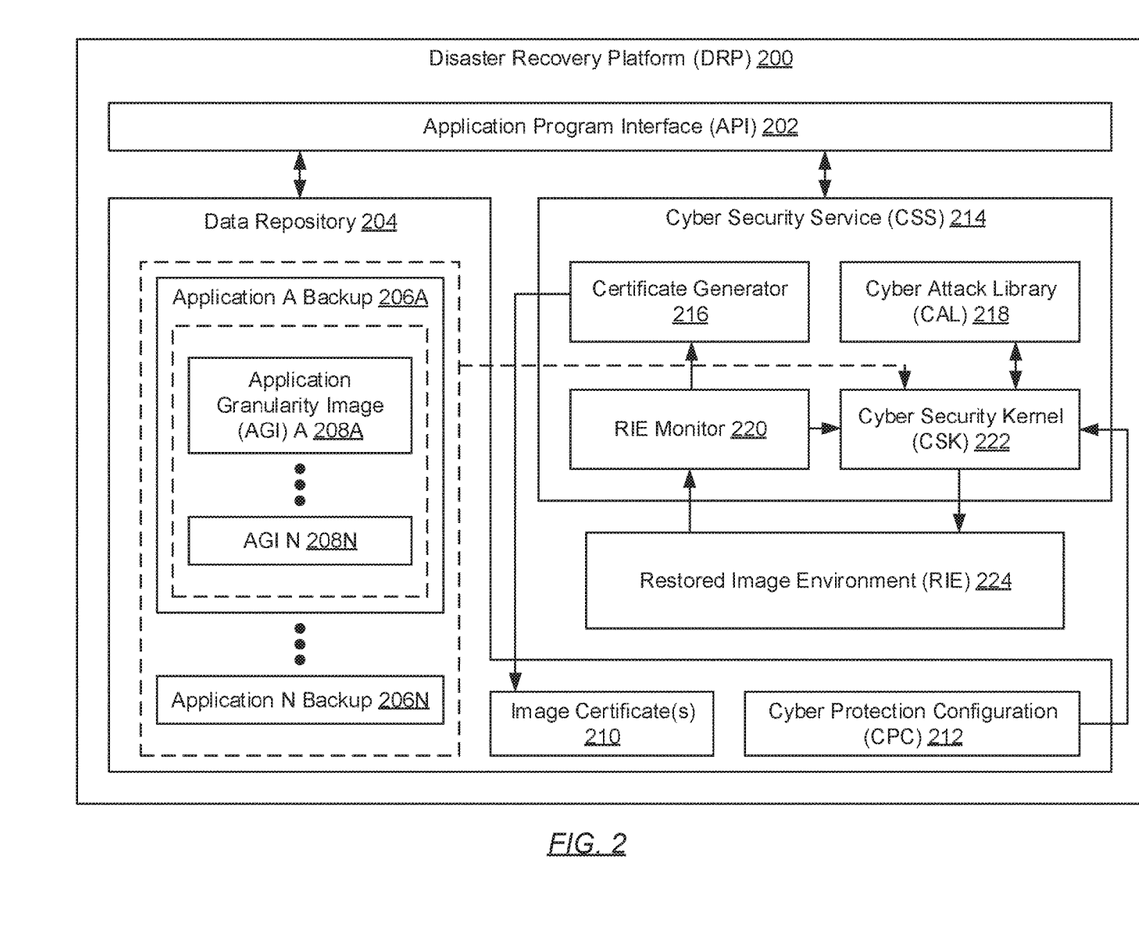
FIG. 2 shows a disaster recovery platform in accordance with one or more embodiments of the invention.

FIG. 2 shows a disaster recovery platform (DRP) in accordance with one or more embodiments of the invention. The DRP (200) includes an application program interface (API) (202), a data repository (204), a cyber security service (CSS) (214), and a replicated image environment (RIE) (224). Each of these components is described below.

In one embodiment of the invention, the API (202) may be hardware and/or software implemented construct that may provide a specification for the exchange of information between the DRP (200) and the PCS (not shown). For example, the API (202) may establish that the exchange of information entails a request for processing and a return of a response, if any, based on the outcome of the processing, wherein the request and response conform to an accepted communication protocol (e.g., hyper text transfer protocol secure (HTTPS)). In one embodiment of the invention, the API (202) may include logic necessary to access the data repository (204) and interact with the CSS (214). By way of an example, the API (202) may be a web API accessed through a webpage and/or web browser, and a WAN (e.g., Internet) connection.

In one embodiment of the invention, the API (202) may include functionality to: (i) receive application granularity images (AGIs) (208A-208N) (e.g., for one or more applications) from the PCS for backup and archiving; (ii) access the data repository (204) to store any received AGIs (208A-208N) in an application backup (206A-206N) reserved for the application(s) with which the received AGIs (208A-208N) are associated; (iii) receive cyber protection reports (described below) from the CSS (214); and (iv) transmit the received cyber protection reports to the PCS (not shown). One of ordinary skill will appreciate that the API (202) may perform other functionalities without departing from the scope of the invention.

In one embodiment of the invention, the data repository (204) may be storage system or medium for consolidating various forms of data. The data repository (204) may be implemented using any type of storage unit and/or device (e.g., a file system, a database, a collection of tables, or any other storage mechanism). Further, the data repository (204) may be implemented using multiple storage units and/or devices, which may or may not be of the same type or located at the same physical site. In one embodiment of the invention, the data repository (204) may be implemented using persistent (i.e., non-volatile) storage media such as, for example, optical storage, magnetic storage, NAND Flash Memory, NOR Flash Memory, Magnetic Random Access Memory (M-RAM), Spin Torque Magnetic RAM (ST-RAM), Phase Change Memory (PCM), or any other memory defined as a non-volatile Storage Class Memory (SCM).

In one embodiment of the invention, the data repository (204) may be configured to store at least: (i) one or more sets of application granularity images (AGIs) (208A-208N); (ii) one or more image certificates (210); and (iii) one or more cyber protection configurations (CPCs) (212). Each of these data items is described below.

In one embodiment of the invention, an AGI (208A-208N) may be an image-based snapshot of any granularity of an application executing on the PCS (not shown) at a given time. Specifically, an AGI (208A-208N) may be an image-based snapshot of a portion of a full application, or alternatively, an image-based snapshot of a full application in entirety. More specifically, in one embodiment of the invention, an AGI (208A-208N) may be an exact copy of a computer process (i.e., an instance of a computer program) executing under a full application (i.e., a computer program) running/residing on the PCS at a given time. In such an embodiment, the computer process may implement a subset of the functionalities and/or responsibilities of the full application under which the computer process is executing.

In another embodiment of the invention, an AGI (208A-208N) may be an exact copy of a full application (e.g., an operating system (OS), an email application, a word processing application, etc.), which may be represented through a set of computer processes that collectively implement all the functionalities and/or responsibilities of the full application. In either of the above-mentioned embodiments, an AGI (208A-208N) may additionally include state information detailing the state of the associated application granularity at the given time, as well as application configurations and data relevant to the associated application granularity at the given time. Furthermore, a AGI (208A-208N) may be generated at the PCS, or alternatively, by a data backup process (not shown) executing on the DRP (200). In one embodiment of the invention, an AGI (208A-208N) may be generated at periodic time intervals based on a backup schedule configured by administrators of the PCS.

Moreover, in one embodiment of the invention, a set of AGIs (208A-208N) associated with an application may be stored in a distinct application backup (206A-206N) within the data repository (204). An application backup (206A-206N) may be a physical or logical partition of the data repository (204) reserved for storage of AGIs (208A-208N) and other information pertaining to one of the one or more applications executing/residing on the PCS (not shown). By way of an example, if the PCS has a web browsing application (or computer program), a calendar application, and a social media application executing thereon, then the data repository (204) may be partitioned into three application backups (206A-206N), where each application backup (206A-206N) stores a set of one or more AGIs (208A-208N) associated with one of the three applications.

In one embodiment of the invention, an image certificate (210) may be a digital or electronic document used to attest that an AGI (208A-208N) is free of cyber security vulnerabilities. An image certificate (210) may be used by the DRP (200) and/or PCS (not shown) to ascertain which set of one or more AGIs (208A-208N) to restore during failover. Further, an image certificate (210) may be generated by the CSS (214) in response to determining that an AGI (208A-208N) exhibits no cyber security vulnerabilities following an assessment (see e.g., FIGS. 3A and 3B). In one embodiment of the invention, an image certificate (210) may include, but is not limited to including the following information: (i) a hash value for the data contained in a respective AGI (208A-208N); (ii) a designation (e.g., a filename, a title, etc.) for the respective AGI (208A-208N); (iii) a pointer (i.e., an object referencing a location in memory) to the respective AGI (208A-208N); (iv) the one or more parameters of one or more cyber security tests specified in a CPC (212) (described below) that lead to the generation of the image certificate (210); and (v) a creation date and/or time associated with the image certificate (210).

In one embodiment of the invention, a CPC (212) may be a script, expressed in computer readable program code, that outlines a cyber security protection plan for a PCS (not shown). Specifically, the CPC (212) may specify the parameters by which the CSS (214) may execute the cyber security vulnerabilities assessment on one or more AGIs (208A-208N). More specifically, the CPC (212) may specify, but is not limited to specifying: (i) which AGIs (208A-208N) representing which one or more applications (i.e., retrieved from which one or more application backups (206A-206N)) are to be subjected to assessments; (ii) which cyber security attacks are to be applied to the selected set of AGIs (208A-208N) during assessments; (iii) the periodicity of the assessments; (iv) whether assessments include recommendations or patches to combat detected cyber security vulnerabilities, if any; and (v) when to re-administer the assessments to the selected set of AGIs (208A-208N) in the event the cyber attack library (CAL) (218) is updated with additional cyber security attacks.

In one embodiment of the invention, the CSS (214) may be a sub-service or a feature hosted by the DRP (200). Specifically, the CSS (214) may be an analytics driven computer service offered to a PCS over the Internet (i.e., the cloud). The CSS (214) may be implemented using hardware, software, firmware, or any combination thereof. Furthermore, the CSS (212) includes a certificate generator (216), a CAL (218), a restored image environment (RIE) monitor (220), and a cyber security kernel (CSK) (222). Each of these components is described below.

In one embodiment of the invention, the certificate generator (216) may be a computer process (or an instance of a computer program) executing on the underlying hardware (i.e., a server, one or more integrated circuits, etc.) of the DRP (200). Specifically, the certificate generator (216) may be a computer process dedicated towards the management of image certificates (210). Thus, the certificate generator (216) may include functionality to: (i) receive vulnerability assessments from the RIE monitor (220); (ii) based on positive vulnerability assessments (i.e., no cyber security vulnerabilities detected), generate image certificates (210) attesting the invulnerability of the tested set of AGIs (208A-208N); (iii) based on negative assessments (i.e., at least one cyber security vulnerability is detected), generate image certificates (210) indicating the at least cyber security vulnerability detected; and (iv) access the data repository (204) to store the generated image certificates (210) therein.

In one embodiment of the invention, the CAL (218) may be a repository for storing sets of computer readable program code, which when executed by the CSK (222), administer one or more known cyber security attacks during a cyber security vulnerability assessment. The CAL (218) may be implemented using any type of storage unit and/or device (e.g., a file system, a database, a collection of tables, or any other storage mechanism). Further, the CAL (218) may be implemented using multiple storage units and/or devices, which may or may not be of the same type or located at the same physical site. In one embodiment of the invention, the CAL (218) may be implemented using persistent (i.e., non-volatile) storage media such as, for example, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other memory defined as a non-volatile Storage Class Memory (SCM).

Moreover, in one embodiment of the invention, the CAL (218) may store cyber security attacks that may include, but are not limited to, malware, phishing attacks, password attacks, denial-of-service (DOS) attacks, man-in-the-middle (MITM) attacks, structured query language (SQL) injection attacks, cross-site scripting (XSS) attacks, session hijacking attacks, spear-phishing attacks, network probing attacks, brute-force cracking attacks, drive-by download attacks, advanced persistent threat (APT) attacks, and ransomware.

In one embodiment of the invention, the RIE monitor (220) may be a computer process (or an instance of a computer program) executing on the underlying hardware of the DRP (200). Specifically, the RIE monitor (220) may be a computer process dedicated towards the monitoring of the RIE (224). Subsequently, in one embodiment of the invention, the RIE monitor (220) may include functionality to: (i) employ a variety of scanning methodologies (e.g., a port scan, a network vulnerability scan, a web application security scan, a database security scan, a host based vulnerability scan, etc.) to discover weak points throughout a restored set of AGIs (208A-208N) in the RIE (224); and (ii) based on the results of the scanning, provide vulnerability assessments to the certificate generator (216) or the CSK (222).

In one embodiment of the invention, the CSK (222) may be an application or computer program for the CSS (214) executing on the underlying hardware of the DRP (200). The CSK (222) may include functionality to: (i) access the data repository (204) to retrieve one or more AGIs (208A-208N) (belonging to one or more applications) and CPCs (212); (ii) based on a CPC (212), restore the selected set of AGIs (208A-208N) in the RIE (224); (iii) based on a CPC (212), access the CAL (218) to retrieve one or more sets of computer readable program code; (iv) execute the one or more sets of computer readable program code to subject the selected set of AGIs (208A-208N) in the RIE (224) to one or more known cyber security attacks; (v) receive vulnerability assessments from the RIE monitor (220); (vi) generate cyber protection reports based on the received vulnerability assessments; and (vii) provide the cyber protection reports to the API (202) for transmission towards the PCS. One of ordinary skill will appreciate that the CSK (222) may perform other functionalities without departing from the scope of the invention.

In one embodiment of the invention, the RIE (224) may be an isolated (i.e., closed and protected) cloud computing environment for executing cyber security tests. In one embodiment of the invention, the RIE (224) may be implemented using a subset of the servers and/or computing systems (see e.g., FIG. 5) that form the DRP (200). In another embodiment of the invention, the RIE (224) may be implemented using a set of servers and/or computing systems in the cloud that exclude those that form the DRP (200). Further, isolation of the RIE (224) may be guaranteed through the implementation of a network configuration on a cloud computing network. The network configuration may, for example, limit access to the RIE (224) from external sources (with the exception of the availability of one computer port through which the RIE monitor (220) may monitor the RIE (224)) and obstruct access to external elements by the computing resources (e.g., virtual machines, containers, etc.) implementing restored AGIs (208A-208N) executing in the RIE (224).

While FIG. 2 shows a configuration of components, other DRP (200) configurations may be used without departing from the scope of the invention. For example, in one embodiment of the invention, the DRP (200) may include multiple RIEs (224) and the CSS (214) may include multiple RIE monitors (220) to provide the capability of attacking and assessing multiple sets of AGIs (208A-208N) concurrently.

Figure 3A:
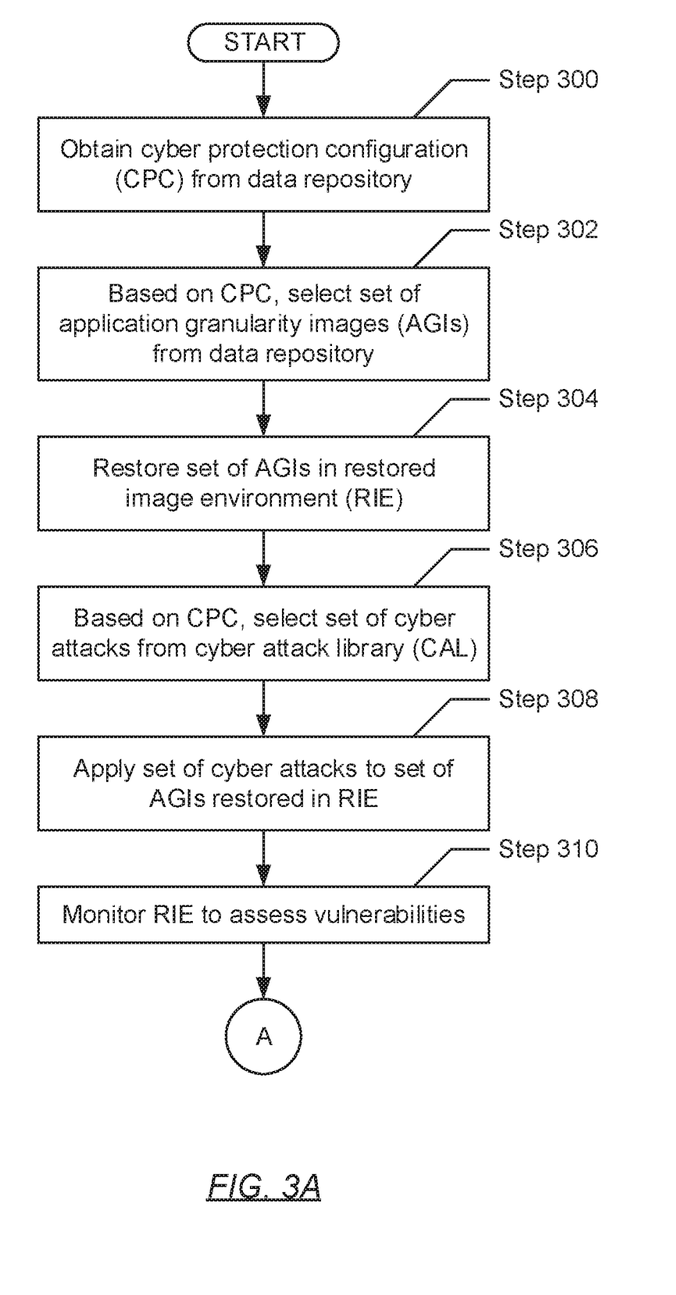
FIGS. 3A and 3B show flowcharts describing a method for implementing cyber security as a service in accordance with one or more embodiments of the invention.
Figure 3B:
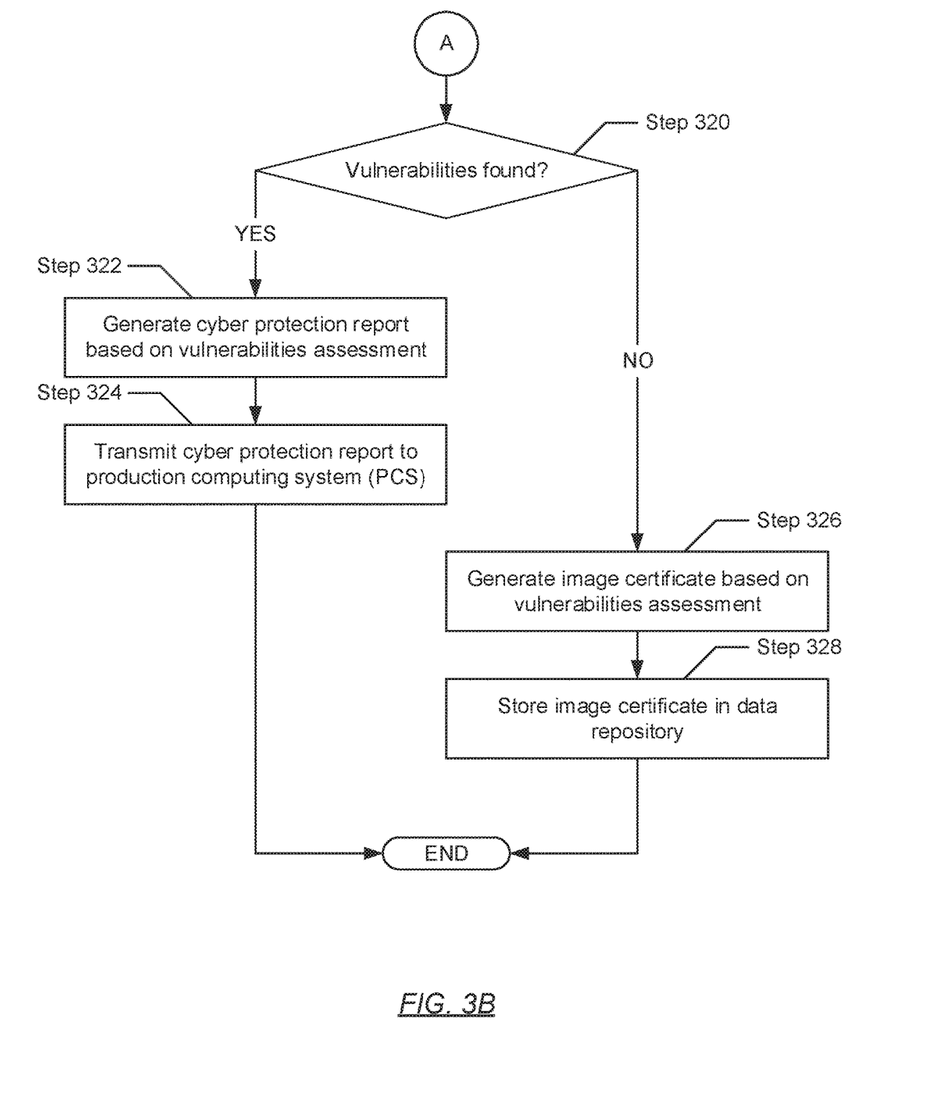

FIGS. 3A and 3B show flowcharts describing a method for implementing cyber security as a service in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

Turning to FIG. 3A, in Step 300, the CSK obtains a CPC from the data repository residing on the DRP. In one embodiment of the invention, the CPC may be obtained in response to an enrollment/activation of the CSS (i.e., a sub-service or feature of the DRP) by administrators of the PCS. Further, the CPC may have been defined by the administrators of the PCS during their enrollment/activation of the sub-service. As described above, in one embodiment of the invention, the CPC may specify, but is not limited to specifying: (i) which AGIs representing which one or more applications (i.e., retrieved from which one or more application backups) are to be subjected to assessments; (ii) which cyber security attacks are to be applied to the selected set of AGIs during assessments; (iii) the periodicity of the assessments; (iv) whether assessments include recommendations or patches to combat detected cyber security vulnerabilities, if any; and (v) when to re-administer the assessments to the selected set of AGIs in the event the CAL is updated with additional cyber security attacks.

In Step 302, based on the CPC (obtained in Step 300), the CSK selects a set of one or more AGIs stored in the data repository. In one embodiment of the invention, the set of AGIs may include one AGI, where the one AGI identifies a computer process (i.e., an instance of a computer program implementing one or more functionalities, features, and/or responsibilities) associated with an application. In another embodiment of the invention, the set of AGIs may include one AGI, where the one AGI identifies a full application (i.e., a computer program), which may be implemented by multiple computer processes. Alternatively, the full application may be identified through multiple AGIs specified in the set of AGIs, where each AGI of the set of AGIs implements a portion (i.e., a subset of the functionalities, features, and/or responsibilities) of the full application. In yet another embodiment of the invention, the set of AGIs may include multiple AGIs, where each mutually exclusive subset of the multiple AGIs identifies at least a portion of a different application. Thus, in such an embodiment, the multiple AGIs may collectively implement multiple applications (which may or may not include an OS), which may identify a portion of a computing system (i.e., a PCS), if not a full computing system in its entirety. Furthermore, in one embodiment of the invention, each AGI in the set of AGIs may correspond to a snapshot of an application granularity executing on the PCS within a margin of time from an exact given time.

In Step 304, the CSK then configures the RIE to restore the selected set of AGIs. Specifically, in one embodiment of the invention, the CSK may allocate DRP computing resources to instantiate one or more virtual machines (VMs) and/or containers to emulate the selected set of AGIs. More specifically, the one or more VMs and/or containers may be programmed to emulate each component, whether the component is hardware, software, or firmware, and their functionalities and interactions, thereby replicating the selected set of AGIs. Alternatively, in one or more embodiments of the invention, the selected set of AGIs may be assessed by way of static running, which may not involve the instantiation of VM(s) and/or container(s) to emulate the set of AGIs in the RIE.

In one embodiment of the invention, a VM may be a distinct operating environment configured to inherit underlying functionality of the host OS (and access to the underlying host hardware) via an abstraction layer. Further, a VM may include a separate instance of an OS, which may be distinct from the host OS. By way of one example, one or more embodiments of the invention may be implemented based on VMware® architecture, which may involve: (i) one or more VMs executing on a host computer system (i.e., the DRP) such that each VM serves as a host to an instance of a guest OS; and (ii) a hypervisor layer serving to facilitate intra-host communication between the one or more VMs and the host computer system hardware. By way of another example, one or more embodiments of the invention may be implemented based on Xen® architectures, which may involve: (i) a control host OS (e.g., Dom 0) including a hypervisor; and (ii) one or more VMs (e.g., Dom U) executing guest OS instances. VMware® is a registered trademark of VMware, Inc. Xen® is a trademark overseen by the Xen Project Advisory Board.

In one embodiment of the invention, a container may be an isolated, lightweight virtualization mechanism (or software construct) that allows for the running of a computer process, an application, or an OS within the container without the overhead of executing a hypervisor (as is needed for executing VMs on underlying hardware). Minimal overhead may be generated by containers because: (i) containers share the same OS kernel with other containers and the underlying host (e.g., a server, a computing system (see e.g., FIG. 5), etc.); and (ii) containers (unlike virtual machines) do not need to emulate physical hardware. Further, containers may be implemented virtually by a host OS.

In Step 306, after configuring the RIE, the CSK selects a set of one or more cyber security attacks based on the parameters outlined in the CPC. Specifically, in one embodiment of the invention, the CSK may access the CAL to obtain one or more scripts/sets of computer readable program code, each of which represent the algorithm to implement one of the set of one or more cyber security attacks.

In Step 308, the CSK applies the selected set of one or more cyber security attacks to the selected set of AGIs restored in the RIE. In one embodiment of the invention, the CSK may apply the set of one or more cyber security attacks by executing the obtained script/set of computer readable program code corresponding to each cyber security attack sequentially. In another embodiment of the invention, the CSK may alternatively instantiate multiple processes (or threads) in order to execute two or more obtained scripts/sets of computer readable program code corresponding to two or more cyber security attacks concurrently.

In Step 310, the RIE monitor surveils the RIE to detect and assess any vulnerabilities. In one embodiment of the invention, the RIE monitor may surveil the RIE while the set of one or more cyber security attacks are being executed by the CSK. Furthermore, specifically, the RIE monitor may employ one or more existing or future developed scanning techniques, which may include, but are not limited to, techniques directed to port scanning, network vulnerability scanning, web application security scanning, database security scanning, and host based vulnerability scanning. Moreover, the employed scanning techniques may be used to discover weak points throughout the selected set of AGIs restored in the RIE.

Turning to FIG. 3B, in Step 320, a determination is made, by the RIE monitor, as to whether any cyber security vulnerabilities were detected. In one embodiment of the invention, a cyber security vulnerability may be a flaw or weakness in system design, implementation, operation, internal controls, or management that could be exploited (either accidentally or intentionally). Further, the exploitation may result in a security breach of the system, which may lead to, for example, data loss, exposure of sensitive data, lack of accountability, denial of access, data corruption, system hijacking and/or impersonation, and other undesirable outcomes. If it is determined that at least one cyber security vulnerability has been detected, then the process proceeds to Step 322. On the other hand, if it is alternatively determined that zero cyber security vulnerabilities have been detected, then the process proceeds to Step 326.

In Step 322, after determining (in Step 320) that at least one cyber security vulnerability has been detected, the RIE monitor submits a vulnerabilities assessment to the CSK. In one embodiment of the invention, the vulnerabilities assessment may be a report detailing the circumstances under which each of the at least one cyber security vulnerability had been detected. These circumstances may include, but are not limited to: (i) which component(s) of the selected set of AGIs was/were discovered to be the flaw or weakness; (ii) which cyber security attack or combination of cyber security attacks exploited the discovered flaw(s) or weakness(es); and (iii) the extent and severity of effects introduced by the cyber security attack(s) on the selected set of AGIs through exploitation of the discovered flaw(s) or weakness(es). Using the vulnerabilities assessment from the RIE monitor, the CSK may subsequently generate a cyber protection report. In one embodiment of the invention, the cyber protection report may further include, based on parameters specified in the CPC, one or more recommendations for protecting the PCS against the one or more cyber security attacks outlined in the vulnerabilities assessment. In yet another embodiment of the invention, the cyber protection report may additionally include one or more patches that may be integrated into the PCS to repair or resolve one or more discovered cyber security vulnerabilities.

Furthermore, in one embodiment of the invention, prior to generating the cyber protection report, the RIE monitor may submit the vulnerabilities assessment to the certificate generator. Based on the vulnerabilities assessment, the certificate generator subsequently generates an image certificate. In one embodiment of the invention, the generated image certificate may be a digital or electronic document outlining the one or more cyber security vulnerabilities detected during the test(s) performed on the selected set of AGIs. Thereafter, the certificate generator may access the data repository to store the image certificate therein.

In Step 324, after generating the cyber protection report, the CSK provides the cyber protection report to the API executing on the DRP. Thereafter, in one embodiment of the invention, the API may format and/or encode the cyber protection report based on the specification for data exchange agreed upon between the DRP and the PCS. Finally, after the formatting and/or encoding, the API transmits the cyber protection report towards the PCS.

In Step 326, after determining (in Step 320) that zero cyber security vulnerabilities were detected, the RIE monitor submits a vulnerabilities assessment to the certificate generator. In one embodiment of the invention, the vulnerabilities assessment may be a report detailing the conditions under which the cyber security test was performed and overcome. These conditions may represent at least a portion of the CPC, and thus, may include, but are not limited to: (i) the selected set of AGIs that was tested; (ii) the one or more cyber security attacks that were executed in the test; and (iii) the duration of the test. Based on the vulnerabilities assessment, the certificate generator subsequently generates an image certificate. In one embodiment of the invention, the generated image certificate may be a digital or electronic document attesting to the invulnerability of the selected set of AGIs tested under the conditions outlined in the vulnerabilities assessment. Finally, in Step 328, after generating the image certificate, the certificate generator accesses the data repository to store the image certificate therein.

Figure 4:
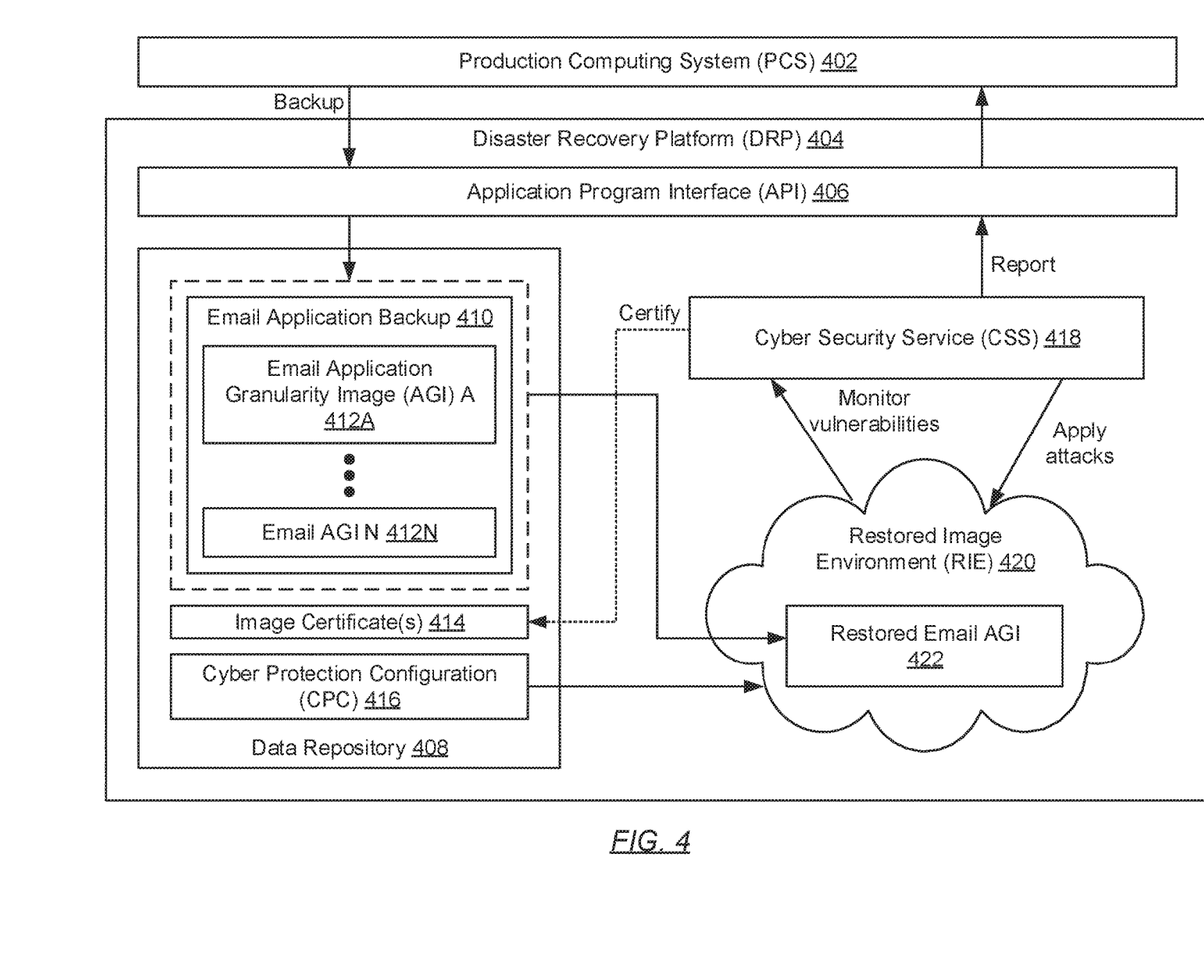
FIG. 4 shows an example system in accordance with one or more embodiments of the invention.

FIG. 4 shows an example system in accordance with one or more embodiments of the invention. The following example, presented in conjunction with components shown in FIG. 4, is for explanatory purposes only and not intended to limit the scope of the invention.

Turning to FIG. 4, the example system includes a production computer system (PCS) (402) operatively connected to a disaster recovery platform (DRP) (404) through an application program interface (API) (406) executing on the DRP (404). The DRP (404) further includes a data repository (408) storing a set of email application granularity images (AGIs) (412A-412N) residing in an email application backup (410) partition, a set of image certificates (414), and a cyber protection configuration (CPC) (416). The DRP (404) additionally includes a cyber security service (CSS) (418) executing thereon, which is operatively connected to the API (406), the data repository (408), and a restored image environment (RIE) (420) also residing on the DRP (404).

Turning to the example, consider a scenario whereby administrators of the PCS (402) have opted to enroll in the cyber security as a service feature offered by the DRP (404). That is to say, in addition to using the DRP (404) as a backup and archiving solution, the enrollment grants the testing of AGIs (412A-412N) in an isolated cloud computing environment to identify cyber security vulnerabilities, if any. As part of the enrollment process, administrators of the PCS (402) specify the parameters under which the testing will be performed, which may be outlined in the CPC (416). For this example, the CPC (416) specifies at least the following information: (i) the selection of an instance of an email application (including its functionalities and interactions) at a given time residing in the email application backup (410) as the selected set of AGIs (e.g., email AGI N (412N)) to be tested; and (ii) the selection of a spear-phishing attack as the cyber security attack to apply to the email application instance during the test. For reference, a spear-phishing attack may be an email-spoofing attack that targets an individual or business seeking unauthorized access to sensitive information such as, for example, credit card and back account numbers, passwords, and other sensitive information.

Upon activation, the CSS (418) accesses the data repository (408) to obtain and read the parameters specified in the CPC (416). Based on the parameters specified therein, the CSS (418) configures the RIE (420) to ready for and subsequently perform the vulnerabilities testing. More specifically, the cyber security kernel (CSK) (not shown) of the CSS (418) identifies the email application instance enclosed as part of the email application backup (410) in the data repository (408), and restores the email application instance/AGI (422), as well as its functionalities and interactions in the RIE (420). The CSK may additionally restore any granularity of any cyber security software application instance (not shown) stored in the data repository (408) near the given time associated with the email application instance in order to assess the effectiveness of the cyber security software application in aiding the email application thwart the spear-phishing attacks. The CSK may restore the email application instance and/or the cyber security software application instance by emulating their implementation and behavior using multiple virtual machines and/or containers. In one embodiment of the invention, the CSK may take it a step further by emulating a variety of actions (e.g., clicking a link enclosed in a spoofed email, responding to spoofed email with sensitive information, running an email anti-virus application on the spoofed email, etc.) that may performed by users operating the email application during subjection of the email application instance to the spear-phishing attack. After restoring the email application instance (422), the CSK may subsequently access the cyber attack library (CAL) (not shown) to identify and retrieve a script/set of computer readable program code which executes the spear-phishing attack specified in the CPC. Upon obtaining the aforementioned computer readable program code, the CSK executes the computer readable program code to apply the spear-phishing attack onto the restored email application instance/AGI (422) within the RIE (420).

While the restored email application instance/AGI (422) is being subjected to the spear-phishing attack in the RIE (420), the RIE monitor (not shown) of the CSS (418) observes at least the restored email application instance/AGI (422) in the RIE (420) in order to discover under which conditions, if any, translate to the exposure of sensitive information or other collateral undesirable effects. The RIE monitor may observe and detect any cyber security vulnerabilities that may be exploited through the restored email application instance/AGI (422) by employing a network and/or web vulnerability scanning and auditing tool.

Based on the observations, in one scenario, the RIE monitor may detect a flaw in the implementation and/or behavior of the restored email application instance (422), the effectiveness of the emulated cyber security software, and/or the potential actions performed by an emulated user operating the restored email application instance (422). Further, in response to the detecting of the flaw(s), the RIE monitor submits a vulnerabilities assessment to the CSK outlining the specific circumstances that resulted in the observed exploitation of the flaw(s). In turn, the CSK generates a cyber protection report based on the received vulnerabilities assessment from the RIE monitor, and further includes, recommendations and/or patches for repairing and/or resolving the discovered flaw(s) in the email application and/or cyber security software. Subsequently, the CSK of the CSS (418) provides the cyber protection report to the API (406). The API (406) formats and/or encodes the cyber protection report and, finally, transmits the cyber protection report to the PCS (402).

In another scenario, based on the observations, the RIE monitor may not detect any flaws in the implementation and/or behavior of the restored email application instance (422), the effectives of the emulated cyber security software, and/or the potential actions performed by an emulated user operating the restored email application instance (422). In response to not detecting any flaws, the RIE monitor submits a vulnerabilities assessment to the certificate generator (not shown) of the CSS (418) outlining at least the parameters of the testing specified in the CPC (416). Using the vulnerabilities assessment, the certificate generator generates an image certificate attesting to the invulnerability of the email application instance (and the cyber security software application instance) at least with respect to combating spear-phishing cyber security attacks. Finally, the certificate generator stores the generated image certificate (414) in the data repository (408).

Figure 5:
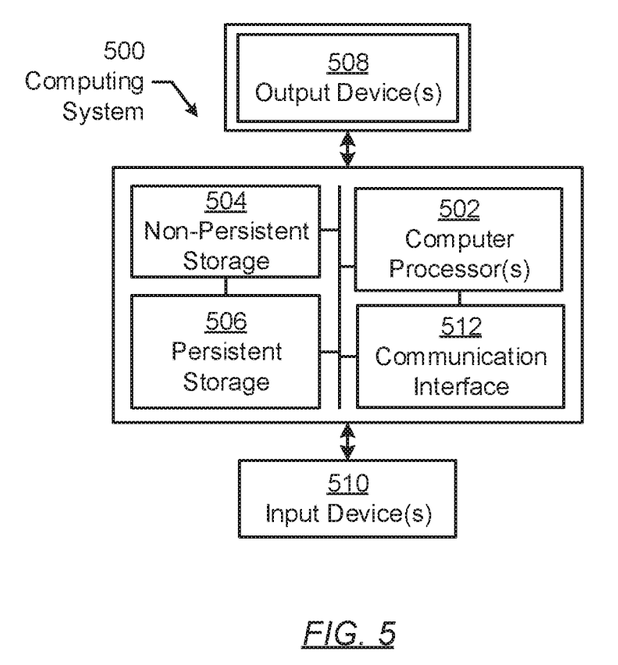
FIG. 5 shows a computing system in accordance with one or more embodiments of the invention.

FIG. 5 shows a computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for implementing cyber security as a service, comprising:

receiving, by a disaster recovery platform (DRP), an application granularity image (AGI) from a production computing system (PCS);

storing, for backup and archiving, the AGI in a data repository;

selecting, based on a first cyber protection configuration (CPC), the AGI and a first set of cyber security attacks;

restoring the AGI in a first restored image environment (RIE);

applying the first set of cyber security attacks to the AGI within the first RIE;

monitoring the first RIE to assess cyber security vulnerabilities exploitable through the AGI by the first set of cyber security attacks, wherein a cyber security vulnerability is discovered to be exploitable;

obtaining, based on monitoring the first RIE, a vulnerabilities assessment used to generate a cyber protection report; and transmitting, to the PCS, the cyber protection report after encoding the cyber protection report based on a network communication protocol.

2. The method of claim 1, wherein the first CPC comprises a set of parameters outlining at least one cyber security test.

3. The method of claim 2, wherein the set of parameters specify a set of AGIs, comprising the AGI, for which the at least one cyber security test will be performed, the first set of cyber security attacks to apply onto the set of AGIs during the at least one cyber security test, and a periodicity for the performing of the at least one cyber security test.

4. The method of claim 1, wherein the AGI represents one selected from a group consisting of a computer process, an application comprising a plurality of computer processes, and a plurality of applications comprising a plurality of mutually exclusive sets of computer processes.

5. The method of claim 1, wherein the first RIE is an isolated cloud-computing environment, wherein restoring the AGI in the first RIE comprises emulating an implementation and a behavior of the AGI using at least one of a group consisting of at least one virtual machine and at least one container.

6. The method of claim 1, further comprising:
selecting, based on a second CPC, the AGI and a second set of cyber security attacks;
restoring the AGI in a second RIE;
applying the second set of cyber security attacks to the AGI within the second RIE;
monitoring the second RIE to assess cyber security vulnerabilities exploitable through the AGI by the second set of cyber security attacks, wherein none of the second set of cyber security attacks are discovered to be exploitable; and
generating, in response to the monitoring the second RIE, an image certificate to be stored in the data repository.

7. A disaster recovery platform (DRP), comprising:
a data repository, and a first restored image environment (RIE); and
a production computing system (PCS) operatively connected to the DRP,
wherein the DRP is programmed to:
receive an application granularity image (AGI) from the PCS;
store, for backup and archiving, the AGI in the data repository;
select, based on a first cyber protection configuration (CPC), the AGI and a first set of cyber security attacks;
restore the AGI in the first RIE;
apply the first set of cyber security attacks to the AGI within the first RIE;
monitor the first RIE to assess cyber security vulnerabilities exploitable through the AGI by the first set of cyber security attacks, wherein a cyber security vulnerability is discovered to be exploitable;
obtain, based on monitoring the first RIE, a vulnerabilities assessment used to generate a cyber protection report; and
transmit, to the PCS, the cyber protection report after encoding the cyber protection report based on a network communication protocol.

8. The DRP of claim of claim 7, further comprising:
a second RIE,
wherein the DRP is further programmed to:
select, based on a second CPC, the AGI and a second set of cyber security attacks;
restore the AGI in the second RIE;
apply the second set of cyber security attacks to the AGI within the second RIE;
monitor the second RIE to assess cyber security vulnerabilities exploitable through the AGI by the second set of cyber security attacks, wherein none of the second set of cyber security attacks are discovered to be exploitable; and
generate, in response to monitoring the second RIE, an image certificate for the AGI to be stored in the data repository.

9. The DRP of claim 7, further comprising a cyber attack library (CAL), from which the first set of cyber security attacks is selected.

10. A non-transitory computer readable medium (CRM) comprising computer readable program code, which when executed by a computer processor residing on a disaster recovery platform (DRP), enables the DRP to:
receive an application granularity image (AGI) from a production computing system (PCS);
store, for backup and archiving, the AGI in a data repository;
select, based on a first cyber protection configuration (CPC), the AGI and a first cyber security attacks;
restore the AGI in a first restored image environment (RIE);
apply the set of cyber security attacks to the AGI within the first RIE;
monitor the first RIE to assess cyber security vulnerabilities exploitable through the AGI by the first set of cyber security attacks, wherein a cyber security vulnerability is discovered to be exploitable;
obtain, based on monitoring the first RIE, a vulnerabilities assessment used to generate a cyber protection report; and
transmit, to the PCS, the cyber protection report after encoding the cyber protection report based on a network communication protocol.

11. The non-transitory CRM of claim 10, wherein the first CPC comprises a set of parameters outlining at least one cyber security test.

12. The non-transitory CRM of claim 11, wherein the set of parameters specify a set of AGIs, comprising the AGI, for which the at least one cyber security test will be performed, the first set of cyber security attacks to apply onto the AGI during the at least one cyber security test, and a periodicity for the performing of the at least one cyber security test.

13. The non-transitory CRM of claim 10, wherein the AGI represents one selected from a group consisting of a computer process, an application comprising a plurality of computer processes, and a plurality of applications comprising a plurality of mutually exclusive sets of computer processes.

14. The non-transitory CRM of claim 10, wherein the first RIE is an isolated cloud-computing environment, wherein restoring the AGI in the first RIE comprises emulating an implementation and a behavior of the AGI using at least one of a group consisting of at least one virtual machine and at least one container.

15. The non-transitory CRM of claim 10, comprising computer readable program code, which when executed by the computer processor, further enables the DRP to:
select, based on a second CPC, the AGI and a second set of cyber security attacks;
restore the AGI in a second RIE;
apply the second set of cyber security attacks to the AGI within the second RIE;

monitor the second RIE to assess cyber security vulnerabilities exploitable through the AGI by the second set of cyber security attacks, wherein none of the second set of cyber security attacks are discovered to be exploitable; and generate, in response to monitoring the second RIE, an image certificate to be stored in the data repository.

\* \* \* \* \*

UNITED STATES PATENT AND TRADEMARK OFFICE
CERTIFICATE OF CORRECTION

PATENT NO. : 10,469,518 B1  
APPLICATION NO. : 15/660236  
DATED : November 5, 2019  
INVENTOR(S) : Assaf Natanzon et al.

Page 1 of 1

It is certified that error appears in the above-identified patent and that said Letters Patent is hereby corrected as shown below:

In the Claims

Column 13, Line 62, in Claim 8, the phrase "of claim of claim" should read -- of claim --.

Signed and Sealed this
Fourteenth Day of January, 2020

Andrei Iancu
*Director of the United States Patent and Trademark Office*